G. E. CAMP.
POTATO DIGGER.
APPLICATION FILED FEB. 15, 1905. RENEWED FEB. 13, 1909.
919,281.
Patented Apr. 20, 1909.
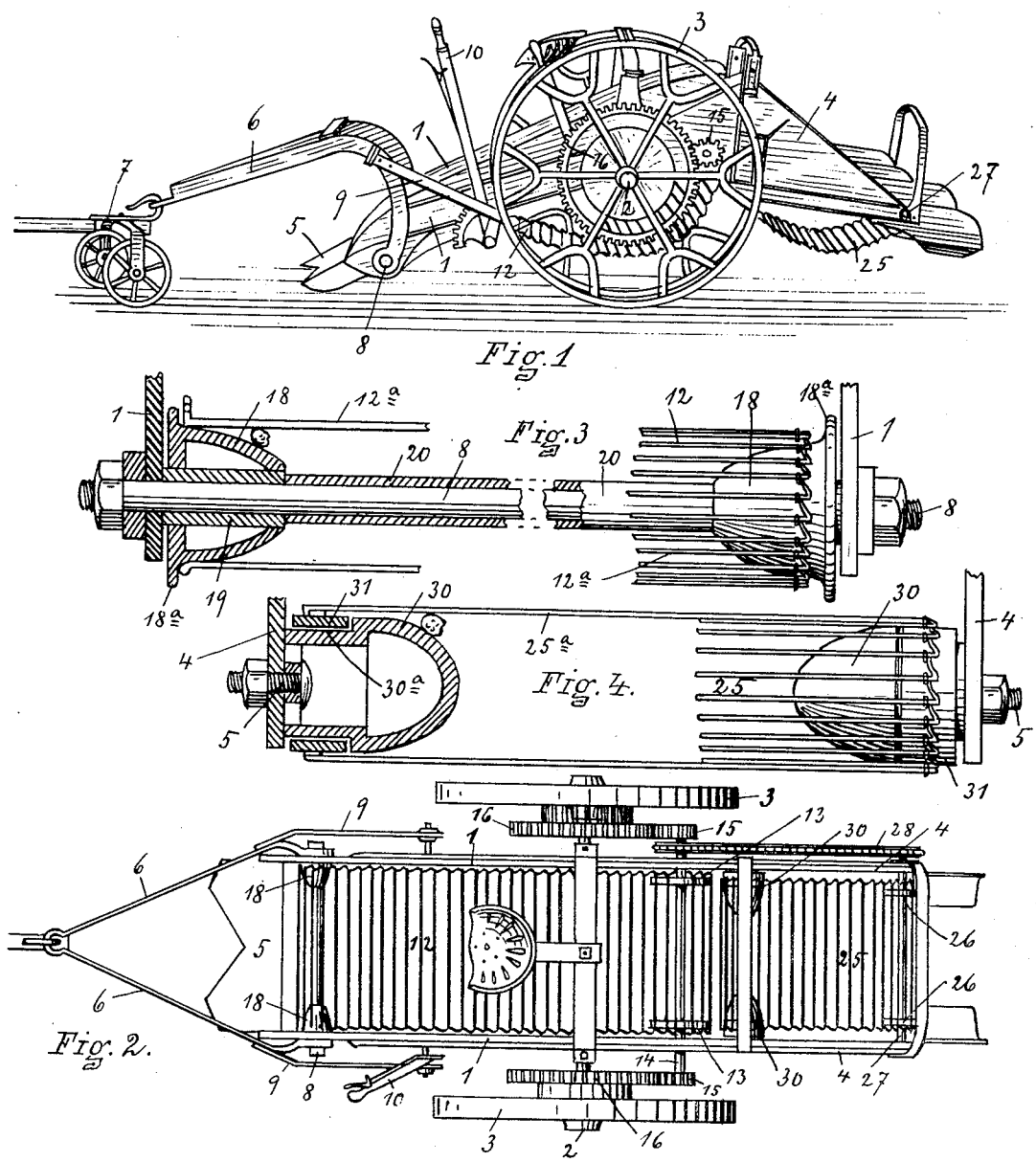

UNITED STATES PATENT OFFICE.

GEORGE E. CAMP, OF UTICA, NEW YORK, ASSIGNOR TO STANDARD HARROW COMPANY, OF UTICA, NEW YORK.

POTATO-DIGGER.

No. 919,281.      Specification of Letters Patent.      Patented April 20, 1909.

Application filed February 15, 1905, Serial No. 245,651. Renewed February 13, 1909. Serial No. 477,765.

*To all whom it may concern:*

Be it known that I, GEORGE E. CAMP, of Utica, in the county of Oneida and State of New York, have invented certain new and useful Improvements in Potato-Diggers; and I do hereby declare that the following is a full, clear, and exact description thereof, which will enable others skilled in the art to which it appertains to make and use the same, reference being had to the accompanying drawings, and to the characters of reference marked thereon, which form part of this specification.

The object of my present invention is to provide certain improvements in potato diggers, whereby provision is made for mounting the carrier in such manner that stoppage or breakage, incident to stones becoming caught between the carrier and the rollers or wheels on which the carrier is mounted, is reduced to a minimum or obviated.

The potato digger to which my improvements are adapted is of that class wherein the earth and potatoes are raised by a plow and delivered onto a belt carrier, consisting of rods through which the dirt and foreign matter sifts, while the potato is carried over and dropped at the rear end of the machine.

In the particular class of machine shown and described in the specification, there are two carriers, one main forward carrier and a rear delivery carrier. These are of similar construction. Heretofore much difficulty has been experienced with this class of machines incident to stones, rocks and other hard substance being caught between the rods or bars of the carrier and the rollers or wheels on which the carrier is mounted, resulting in frequent stoppage of the machine or in breakage. Frequent stoppage incident to such a cause in the operation of this class of machines, as well as absolute break-downs, are matters of serious objection and fault.

In the drawings Figure 1 shows a perspective view of a machine of my improved construction, and in which the improvements herein referred to are provided. Fig. 2 is a plan view of the same. Figs. 3 and 4 show details particularly of the improvement in question.

Briefly described the machine in question consists of two main side boards 1—1 mounted upon an axle-tree 2 carried by supporting and driving wheels 3, and having a rear section consisting of side boards or plates 4 pivotally connected to the main part for angular adjustment with reference thereto. In the forward end of the machine there is provided the shovel or plow 5 secured strongly and firmly to the machine, and to the front end of the machine is attached a draft yoke 6 adapted to be connected to a small truck 7, to which the draft animals are attached. The draft yoke 6 is forked at the rear end and pivotally connected to the body of the machine on a cross shaft or rod 8.

The draft yoke 6 is connected with a rock shaft and cranks thereon on the body by means of links 9, and a lever 10 is provided whereby the relative relation of the draft yoke and the body of the machine may be regulated, whereby the plow 5 can be raised above the ground, as shown in Fig. 1, or lowered so as to enter the ground.

The main carrier 12 consists of a belt of bars extending substantially the full length of the side bars or main frame of the machine, and at the rear end passing around sprocket wheels 13—13 on the shaft 14, spanning the rear end of the machine. The sprocket wheels and shaft 14 are driven by means of the pinions 15, on its respective ends engaging with large gear wheels 16 provided on the traction wheels 3. The carrier belt 12 at its forward end passes around a pair of rollers 18 of conoidal form. As shown in Fig. 3, these rollers are mounted to rotate freely on bushings 19 provided on the cross rod 8 before mentioned. The bushings 19 are confined between the sides 1 of the machine and the spacing sleeve 20 extending between the bushings 19 on the opposite side of the machine.

It will be noted that the rods or bars $12^a$ of the carrier 12 rest on the roller 18 close to its base end, and that the form thereof causes the bar and face of the roller to rapidly separate as they extend toward the middle of the machine. When a stone or other hard substance is caught between the carrier and the roller 18, it will tend to throw off the carrier. This is permitted to some extent by a certain amount of slack provided in the carrier belt. When it has proceeded to some extent, however, the pinch between the inner side of the rod, as $12^a$ of the carrier and the inclined surface of the roller 18 operates to throw out the stone or obstruction toward the middle of the machine, thereby at once relieving the machine and obviating any stoppage or breakage. There may be provided around the base of the conoidal roller 18 a flange portion 18ª, which tends to guide the carrier and prevent the roller shifting to a position toward the middle of the machine.

In the rear section of the machine there is provided the carrier 25, similar in construction to the carrier in the forward section, except that it preferably has its bars spaced farther apart. This carrier passes around sprocket wheels 26 in the rear end of the rear section, which sprocket wheels are mounted on a shaft 27 and driven by a sprocket chain 28 from the shaft 14 before mentioned. The same form of conoidal roller or bearing as 18 may be provided for the forward end of the carrier 25 to pass around, but I have preferred to show herein a modified form of construction, which consists of a fixed conoidal bearing 30 secured to the side or frame plate 4 by a bolt 5 passing through a cross bar in the base thereof and through the side plate 4. The base portion of the part 30 may be slightly reduced, as indicated at 30ª, to receive the ring 31, which is free to rotate on the piece 30.

The outer ends of the cross bars or rods 25ª of the carrier 25 will rest in the main on the ring 31, although they may also rest on the part 30 directly. In the ordinary operation of the machine, the parts being full of and covered with dirt, the ring 31 will ordinarily not run with the carrier belt, but will remain stationary mostly, except when a strain is put on the carrier belt, and the belt will slip around, the two parts 30 and 31 standing substantially still. However, when a strain is placed on the carrier belt either by an obstruction getting partially in between the belt and the bearing or otherwise, the ring 31 may make a few revolutions until the device gets in normal working order. I also contemplate securing the part 30 by means of a bolt or otherwise, so that it may be free to rotate, particularly when an excessive strain is placed on the carrier. This form of construction shown in Fig. 4 and just described operates substantially as that heretofore described; that is to say, when an obstruction, as a stone or other foreign substance, gets pinched between the bars of the carrier and the inclined face of the bearing, it will be thrown out toward the middle of the machine readily freeing itself from such obstruction.

What I claim as new and desire to secure by Letters Patent is:

1. The combination in a potato digger of an open belt carrier and a pair of conoidal rollers on the conoidal faces of which the edges of the carrier run, substantially as and for the purposes described.

2. The combination in a potato digger of a frame having a pair of inwardly projecting conoidal rollers and an open carrier belt, the opposite edges of which run on the conoidal faces of said conoidal rollers, respectively, substantially as set forth.

3. The combination in a potato digger of a frame, a pair of inwardly projecting conoidal rollers, and a carrier belt consisting of chains and cross rods, the edges of which belt respectively run on conoidal faces of said conoidal rollers, substantially as set forth.

4. The combination in a potato digger of a frame having a cross rod extending between the opposite sides of the frame, the bearing sleeves 19 and the spacing sleeve 20 provided on said cross rod, the inwardly facing conoidal rollers 18 having flanges 18ª and the carrier belt consisting of rods and chains, the opposite edges of which belt respectively run on the conoidal faces of said conoidal rollers, substantially as set forth.

In witness whereof, I have affixed my signature, in presence of two witnesses, this 8th day of February 1905.

GEORGE E. CAMP.

Witnesses:
EMMA S. HESSE,
S. I. DE VINE.